United States Patent
Fitch et al.

(10) Patent No.: US 9,529,198 B2
(45) Date of Patent: Dec. 27, 2016

(54) OPTO-MECHANICAL SYSTEM FOR HEAD-MOUNTED DEVICE

(71) Applicant: Google Inc., Mountain View, CA (US)

(72) Inventors: John Stuart Fitch, Los Altos, CA (US); Michael Kubba, Mountain View, CA (US); Peter Michael Cazalet, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/472,984

(22) Filed: Aug. 29, 2014

(65) Prior Publication Data
US 2016/0062119 A1    Mar. 3, 2016

(51) Int. Cl.
G02B 27/14 (2006.01)
G02B 27/01 (2006.01)
G02B 7/00 (2006.01)

(52) U.S. Cl.
CPC ........... *G02B 27/0176* (2013.01); *G02B 7/003* (2013.01); *G02B 2027/0178* (2013.01)

(58) Field of Classification Search
CPC ............ G02B 27/0172; G02B 27/0101; G02B 2027/0178; G02B 2027/0132; G02B 2027/011
USPC ................. 359/629–633, 636, 639–640, 618
See application file for complete search history.

(56) References Cited

U.S. PATENT DOCUMENTS

| 5,003,300 | A | 3/1991 | Wells |
| 5,048,077 | A | 9/1991 | Wells et al. |
| 5,903,395 | A | 5/1999 | Rallison et al. |
| 5,954,642 | A | 9/1999 | Johnson et al. |
| 5,991,085 | A | 11/1999 | Rallison et al. |
| 6,750,832 | B1 | 6/2004 | Kleinschmidt |
| 7,193,783 | B2 | 3/2007 | Willey et al. |

(Continued)

FOREIGN PATENT DOCUMENTS

| EP | 1180337 A2 | 2/2002 |
| GB | 2494115 A | 3/2013 |

(Continued)

OTHER PUBLICATIONS

International Search Report and Written Opinion for PCT Application No. PCT/US2015/046085, dated Nov. 26, 2015.

*Primary Examiner* — Scott J Sugarman
*Assistant Examiner* — Vipin Patel
(74) *Attorney, Agent, or Firm* — Lerner, David, Littenberg, Krumholz & Mentlik, LLP

(57) ABSTRACT

Opto-mechanical systems, methods of assembly, and devices utilizing opto-mechanical systems are disclosed. One example opto-mechanical system includes an optics housing; an optics display; and a display module. The optics display can extend away from a first open end of the optics housing to display images to a user. A display module is positioned adjacent a second open end of the optics housing. The display module may be constructed and arranged to project images onto the optics display. The display module further comprises a display module housing, as well as module displays that are positioned within the display module housing. The optics housing may be constructed and arranged to join the display module to the optics housing. The display module can be positioned within the optics housing and is spaced a predetermined distance away from the first surface of the optics display.

20 Claims, 12 Drawing Sheets

(56) References Cited

U.S. PATENT DOCUMENTS

| | | |
|---|---|---|
| 8,035,576 B2 | 10/2011 | Ishino et al. |
| 8,159,751 B2 | 4/2012 | Martins |
| 8,467,598 B2 | 6/2013 | Berkovich et al. |
| 8,705,177 B1 | 4/2014 | Miao |
| 2005/0219152 A1 | 10/2005 | Budd et al. |
| 2006/0168859 A1 | 8/2006 | Pombo et al. |
| 2007/0262971 A1 | 11/2007 | Hahn |
| 2009/0109513 A1 | 4/2009 | Bostaph |
| 2009/0243965 A1 | 10/2009 | Price et al. |
| 2011/0214082 A1 | 9/2011 | Osterhout et al. |
| 2012/0062445 A1 | 3/2012 | Haddick et al. |
| 2012/0069448 A1* | 3/2012 | Sugihara ............ G02B 27/0176 359/643 |
| 2012/0200935 A1* | 8/2012 | Miyao ................ G02B 27/0172 359/630 |
| 2013/0182334 A1* | 7/2013 | Sugihara ............ G02B 27/0172 359/630 |
| 2013/0235331 A1* | 9/2013 | Heinrich ................ G02C 11/10 351/158 |
| 2013/0278631 A1 | 10/2013 | Border et al. |
| 2013/0322683 A1 | 12/2013 | Jacobs |
| 2014/0028968 A1 | 1/2014 | Olsson et al. |
| 2014/0092461 A1 | 4/2014 | Spitzer et al. |
| 2014/0139403 A1* | 5/2014 | Hiraide .............. G02B 27/0172 345/8 |

FOREIGN PATENT DOCUMENTS

| | | |
|---|---|---|
| JP | 2008-067285 A | 3/2008 |
| WO | 9600406 A1 | 1/1996 |
| WO | 2014100891 A1 | 7/2014 |

\* cited by examiner

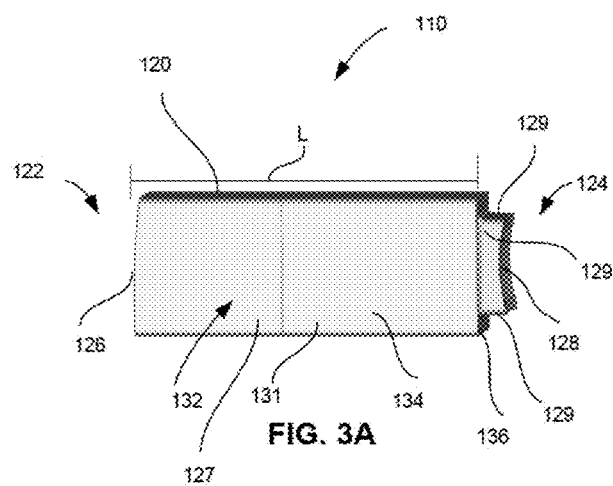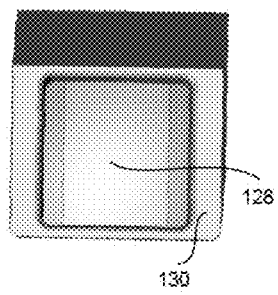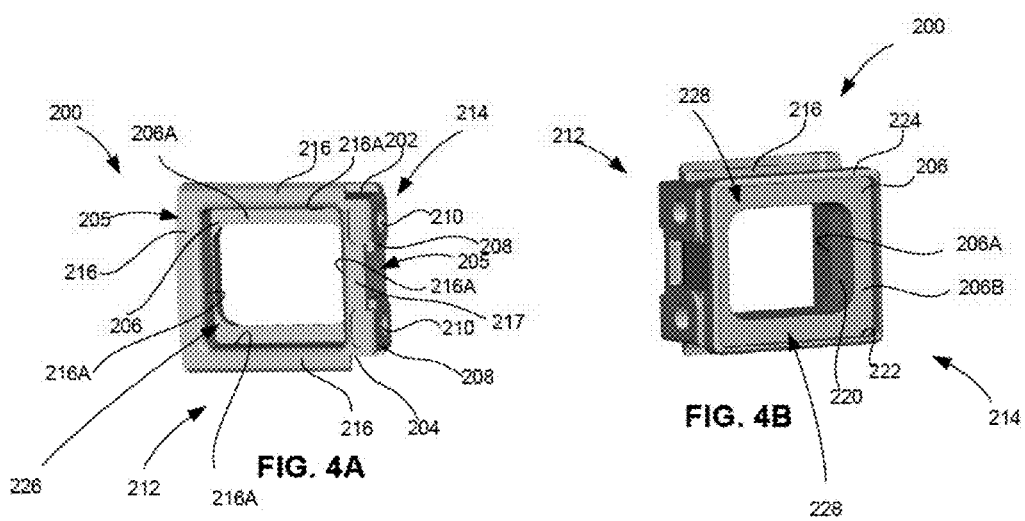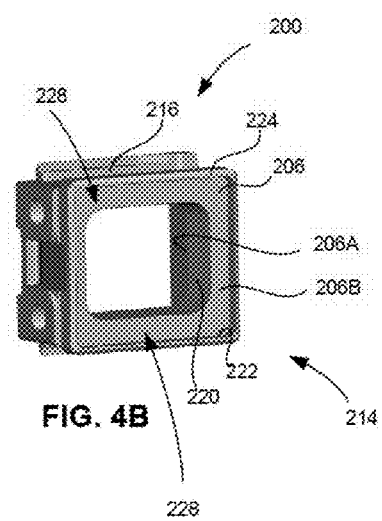

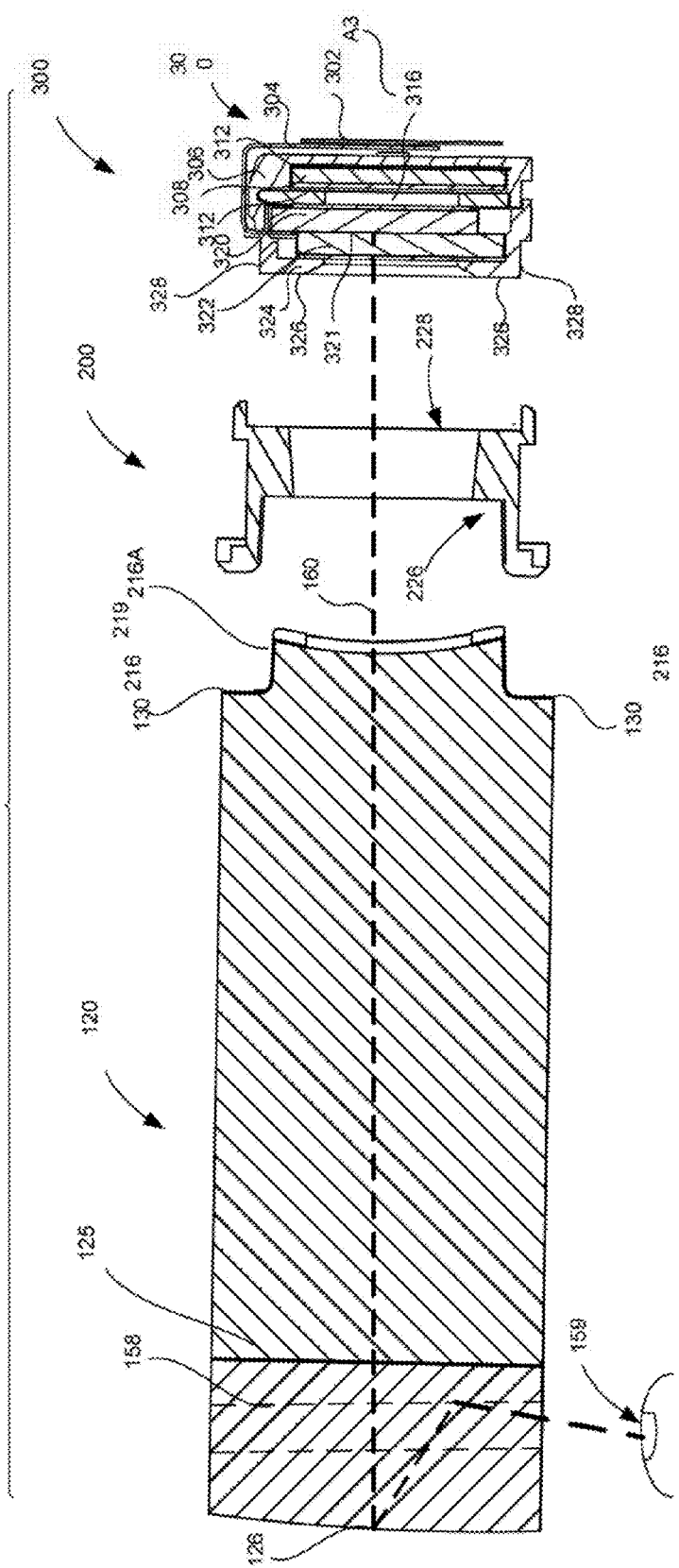

OPTO-MECHANICAL SYSTEM FOR HEAD-MOUNTED DEVICE

BACKGROUND

Computing devices such as personal computers, laptop computers, tablet computers, cellular phones, and countless types of internet-capable devices are increasingly prevalent in numerous aspects of modern life. The trend toward miniaturization of computing hardware, peripherals, as well as sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Computing devices with near-eye displays may also be referred to as "head-mountable displays," "head-mounted displays," "head-mounted devices," or "head-mountable devices." A head-mountable or head-mounted device places a graphic display or displays close to one or both eyes of a wearer. To generate images on a display, a computer processing system may be used. Such displays may occupy a wearer's entire field of view, or only occupy part of a wearer's field of view. Further, head-mounted displays may vary in size, taking a smaller form such as a glasses-style display, for example.

Opto-mechanical systems are used to house the display onto which images are viewed by a user, and to connect and communicate with the rest of the head-mounted device. Integration of precision optics with displays and back-light/ front lights in a compact housing environment is a leading concern for such opto-mechanical systems that are implemented within head-mounted devices. Although advancements have been made, there is still need for improved opto-mechanical systems.

BRIEF SUMMARY

Example embodiments disclosed in the present application can address the aforementioned concerns by providing user devices, such as head mounted-devices, with improved opto-mechanical systems and methods of assembling the opto-mechanical systems. To that end, opto-mechanical systems and methods of assembling opto-mechanical systems within compact devices disclosed in the present application can provide optimal images. In some examples, the opto-mechanical systems can provide one or more of improved structural integrity of the system, precision location of the optics display and the display module, and a protective seal of the system that protects against the environment. It is to be appreciated that the opto-mechanical systems and methods, as well as the devices incorporating these systems and methods, are not limited to one or more such improvements and may further include additional improvements not expressly discussed herein.

In one aspect of the disclosure, a method of assembling an opto-mechanical system for a head-mounted device includes joining an optics display to a first open end of an optics housing; positioning a display module within a second open end of the optics housing; moving the display module while positioned within the optics housing and securing the display module to the optics housing so that the display module and optics display are fixed relative to one another. The display module can project images onto the optics display and may be moved in up to six degrees of freedom. The display module can be moved within the optics housing relative to the optics display so that a first axis extending through the display module is aligned with a second axis extending through the optics display.

In one embodiment of this aspect, the display module may further include a housing that houses at least one display module.

In another example, the step of securing the optics display to the optics housing occurs prior to the step of aligning the display module.

In another example of this aspect, the step of aligning the display module further includes moving the display module so that a first central axis extending through a mechanical center of the display module is aligned with a second central axis extending through the mechanical center of the optics display. The step of aligning the display module can also further include axially aligning the first central axis of the display module within a predetermined tolerance relative to the second central axis. Additionally, the first and second central axes may further be aligned along a horizontal plane.

In another example of this aspect of the disclosure, prior to the step of securing the display module to the optics housing, the display module is adjusted relative to the optics display and within the optics housing so as to obtain an image having at least one predetermined image quality selected from the group comprising brightness, sharpness, contrast, focus, and modulation transfer function ("MTF"). The step of aligning the display module may also occur before the step of adjusting the display module. The display module may be adjusted so that brightness ranges from 1300-1500 nits; a contrast ratio ranges from 70:1 to 100:1; a minimum 3-pixel MTF equals 30%; a minimum 5 pixel MTF equals 50%; and a maximum distortion of 3%.

In another example of this aspect of the disclosure, the display module may be adjusted so that the image has more than one predetermined image quality. For example, it may be adjusted only for two predetermined image qualities, such as brightness and MTF, or the display module may be adjusted so that all four example image qualities are achieved.

In another example of this aspect of the disclosure, a groove may be formed between the display module and the optics housing. A sealant material may be disposed within the groove.

In another example, the opto-mechanical system is sealed so that the opto-mechanical system has an Ingress Protection rating of at least IP67.

Turning now to another aspect of the present disclosure, an opto-mechanical system for a head-mounted device includes an optics housing, an optics display, and a display module. The optics housing may include a first open end and a second open end. The optics display may extend away from the first open end of the optics housing and include a first surface adapted to display images. In some examples of the optics display, the optics display can be a transparent prism having a rectangular shape. The display module can be positioned adjacent the second open end of the optics housing and can be constructed and arranged to project images onto the optics display. The optics housing may join the optics housing and display module together and includes a first surface facing the display module. The display module can be positioned within the optics housing and spaced a first predetermined distance away from the first surface of the optics display. The optics housing, optics display, and display module may also be fixed relative to one another. At least a portion of the optics display may be positioned external to the optics housing.

In another example of this aspect, the optics housing may include a second surface facing the optics display. The optics display can be positioned within the optics housing and spaced a second predetermined distance away from the first surface of the optics housing.

In another example of this aspect, a gap may be positioned between an exterior surface of the display module and an exterior surface of the optics housing. A sealant can be disposed within the gap. The opto-mechanical system may have an Ingress Protection rating of at least IP67.

In another example of this aspect, the optics housing, the optics display, and the display module further include an axis extending through the respective mechanical centers of these components. The axes of the optics housing, optics display, and display module may be axially aligned along a horizontal plane.

In yet another aspect of the disclosure, a head-mounted device assembly includes a central frame support and an opto-mechanical system for displaying images to a user. The central frame support may include a first side arm and a second side arm that extends away from first and second ends of the frame support. The opto-mechanical system may extend in a horizontal direction and include an elongated optics display that extends at least partially in front of the central frame support. The opto-mechanical system may further include an optics housing, an optics display, and a display module. The optics housing may include a first open end and a second open end. The optics display may extend away from the first open end of the optics housing and may display images on a surface of the optics display. The display module may be positioned adjacent the second open end of the optics housing and is constructed and arranged to project images onto the optics display. The display module may further comprise a display module housing. The optics housing joins the optics display and display module together. The optics housing may have a first surface facing the display module and may be positioned within the optics housing and spaced a first predetermined distance away from the first surface of the optics display.

In one example of this aspect, the opto-mechanical system is at least partially housed within one of the side arms. The opto-mechanical system may also be completely housed within one of the side arms and the side arm may be removably connected to the central frame support.

BRIEF DESCRIPTION OF THE DRAWINGS

FIGS. 3A-3B are first and second side views of an optics component of the example opto-mechanical system of FIG. 1.

FIGS. 4A-4B are perspective views of an optics housing of the example opto-mechanical system of FIG. 1.

FIG. 6 is an exploded cross-sectional view of the example opto-mechanical system of FIG. 1.

DETAILED DESCRIPTION

Example methods and systems are described herein. It should be understood that the words "example" and "exemplary" are used herein to mean "serving as an example, instance, or illustration." Any embodiment or feature described herein as being an "example" or being "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

Figure 1:
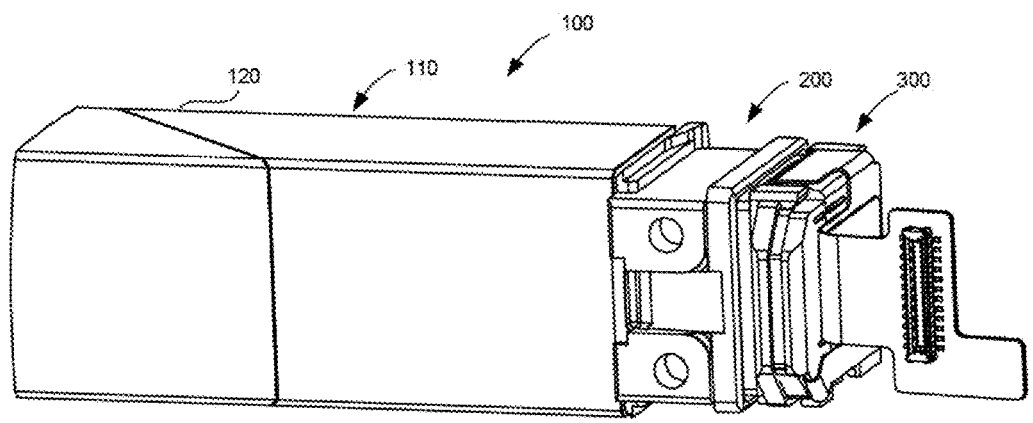
FIG. 1 is a perspective view of an example opto-mechanical system according to one aspect of the disclosure.

FIG. 1 is a perspective view of an opto-mechanical system 100 that can be implemented within head-mounted display devices in accordance with aspects of the present disclosure. In this example, opto-mechanical system 100 can transmit data, information, or images to an optics display 110, such as prism 120, that can then be viewed by a user wearing a head-mounted device (not shown) incorporating opto-mechanical system 100.

Figure 2:
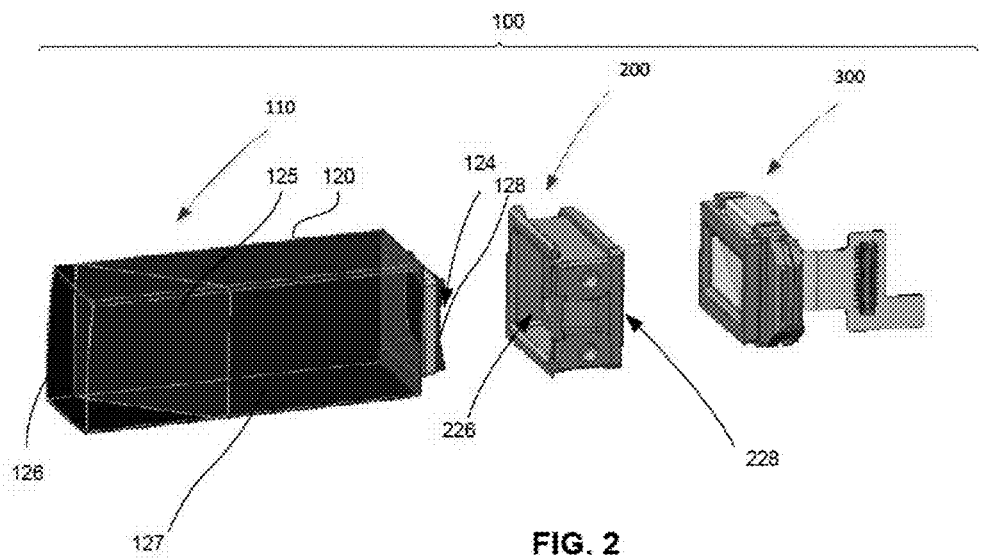
FIG. 2 is an exploded perspective view of the example opto-mechanical system of FIG. 1.

With reference to FIG. 2, an exploded view of opto-mechanical system 100 is shown. In this example, opto-mechanical system 100 includes three primary components that can be assembled together: (1) optics display 110; (2) optics housing 200; and (3) display module 300. In other examples, fewer or a greater number of components may be used to form system 100. For example, optics housing 200 and display module 300 may instead be constructed and arranged as a single, unitary component, such that the opto-mechanical system 100 includes only two primary components.

Turning to FIG. 3A, a first component of opto-mechanical system 100 is optics display 110. In this example, optics display 110 may be a prism 120 that is used to display an image generated by the electronic components of the display module (not shown). Prism 120 is structured to receive a projected image in a receiving end 124 and to make that image visible to a user by looking into a user viewing side of prism 120. This can be done by manufacturing prism 120 with a specific shape or certain material characteristics. For example, prism 120 may be a see-through display, which is made of glass and/or another transparent or translucent material, such that the user is able to view his/her environment through prism 120.

Prism 120 is generally rectangular in shape, but can take on other shapes in alternative examples, such as cylindrical, triangular, or tapered. First end 122 of prism 120 has a curved or rounded surface 126. Surface 126 may be a mirrored surface that can redirect light traveling through prism 120. For example, surface 126 may include a coating that may be a mirror or other partially reflective coating such as layered dielectric coatings. In this example, surface 128 is concave but, in other examples, receiving surface 128 can take on a variety of shapes, as needed. For example, receiving surface 128 can have an optical form such as a concave spherical shape, a convex spherical shape, or a freeform shape, depending on the optical design. As best seen in FIG. 3B, receiving end 124 further includes a surface 130 that is generally planar and extends around receiving surface 128. An edge surface 129 (FIG. 3A) extends between surface 128 and surface 130, and around surface 130 of prism 120.

As best seen in FIG. 2, a redirection surface 125 can be positioned between receiving surface 128 and end surface 126. Intermediate surface 125 may extend at an angle relative to outer surface 127 of prism 120. Surface 128 may be planar, but may also take on other optical forms or shapes to redirect light in a designed way.

Turning back to the example shown in FIG. 3A, images, data, or information can be projected from the display module onto prism 120, which is then directed toward the user's eye and focused onto the user's retina. Prism 120 can be configured so that the user is able to view the displayed data or information when prism 120 is positioned at a relatively short distance from the eye, such as a distance from which a typical user's eye could not directly focus. Prism 120 can further be configured to appear as a much larger image, positioned at a much greater distance from the user's eye. Further, prism 120 can be configured to extend laterally over the user's eye and portions of the user's face, adjacent to the user's eye at a distance beyond what is needed to project the desired image to the user's eye. Accordingly, prism 120 can include a projection area 130 that is the portion of inner surface 132 of prism 120 through which the focused light of the projected image passes. The remaining portions of prism 120 can be present to increase the area of prism 120 through which a user can see his or her surroundings and, in particular, to space out the housing components of the head-mounted device (not shown in this view) from the user's eye. In this example, prism 120 has a length L of 26 mm. In another example, length L may range between 10-45 mm. In still other examples, length L may be greater or shorter depending on the overall design. For example, length L may be greater than 2 mm. In another example, length L may be less than 10 mm or less than 45 mm.

Receiving surface 128 can be generally perpendicular to the viewing surface 131 of prism 120 such that a transparent prism can be used to combine the projected image with a view of the environment surrounding the wearer of the device. This allows the user to observe both the surrounding environment and the image of the display module. Prism 120 and the display electronics within display module 300 (not shown) can be configured to present an opaque or semi-transparent image, or a combination thereof, to achieve various desired image combinations.

With reference back to FIG. 2, a second component of the opto-mechanical system can include a spacer or optics housing 200 that joins the components of the opto-mechanical system 100 together. In this example, optics housing 200 is a central component of opto-mechanical system 100. Optics housing 200 is shown positioned between prism 120 and display module 300 and connects these components together. Optics housing 200 has a first open end 226 for receiving prism 120 and a second open end 228 for receiving display module 300. Optics housing 200 can be further designed to precision align prism 120 relative to display module 300, such that the data or information provided to a user is sharp and in focus. Due to its overall structure, optics housing 200 can absorb shock and vibration loads on the system 100.

Optics housing 200 can be made from a variety of materials. In one example, optics housing 200 is made from a metal. Titanium is one example of a metal suitable for manufacture of the optics housing due to its characteristics, e.g., generally light, strong, and possessing a coefficient of thermal expansion similar to glass. In other examples, the optics housing may be made from different types of metals or alloys, or plastic or polymeric materials, including, without limitation, polyether ether ketone (PEEK). Optics housing 200 may further include coatings to enhance optical performance. For example, an interior surface of optics housing 200 may be coated with black to minimize stray light reflection.

With reference now to FIGS. 4A-4B, features of optics housing 200 are shown in more detail. Turning first to FIG. 4A, optics housing 200 is a generally square-shaped component that includes a top surface 202, a bottom surface 204, and edge surfaces 205 extending between respective top and bottom surfaces 202,204. Structural mounts can be incorporated into optics housing 200 to provide a connection between optics housing 200 and other components external to optics assembly. For example, structural mounts 208 include openings 210 that can receive screws, or the like, for connection to other components in a head-mounted device system.

One side of optics housing 200 is intended to face toward the prism, and the opposite side of optics housing 200 is intended to face the display module. For example, prism side 212 of optics housing 200 faces prism 120, and display module side 214 of housing 200 faces the display module. A divider 206 can separate prism side 212 from display module side 214.

FIG. 4A illustrates first open end 226 of optics housing 200 and the features of prism side 212 of optics housing 200. Divider 206 includes divider surface 206A that can face the prism. Divider surface 206A extends downward away from top surface 202 and bottom surface 204. An interior surface 216A extends away from divider surface 206A, as well as around the circumference of optics housing 200. Front flange surface 216 extends away from respective top and bottom surfaces 202,204, as well as edge surface 216A. Front side edge surface 217 is adjacent flange surface 216 and also extends away from edge surface 216A at a point where flange surface 216 does not. Opening 218 extends through optics housing 200.

FIG. 4B illustrates second open end 228 of optics housing 200, as well as the features of optics housing 200 from display module side 214. Divider surface 206B of divider 206 can face the display module. Divider 206 includes an interior edge 220 that extends between divider surface 206A and divider surface 206B. Divider 206 is recessed away from outer edge 224, such that an interior edge surface 222 extends around the circumference of optics housing 200 at the display module side 214.

Figure 5A:
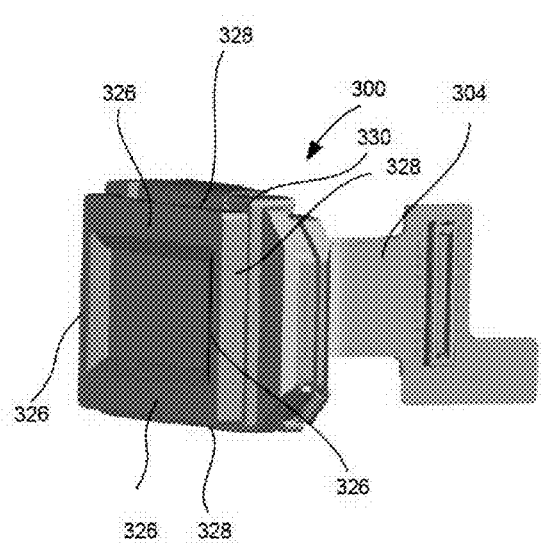
FIG. 5A is a perspective view of an example display module of the example opto-mechanical system of FIG. 1.

With reference now to the third component of opto-mechanical system 100, a front perspective view of display module 300 is shown in FIG. 5A. Display module 300 can include a source for generating images or data onto the receiving side of the prism. For example, display module 300 may include projectors that include an image source, such as liquid crystal displays (LCD), cathode-ray tubes (CRT), front-lit reflective displays; back-lit transmissive displays, and organic light emitting diode (OLED) displays, for focusing the image on an appropriate area of prism 120. The electronic components associated with display module 300 can also include control circuitry for causing the projector to generate the desired image based on the video signal received.

Figure 5C:
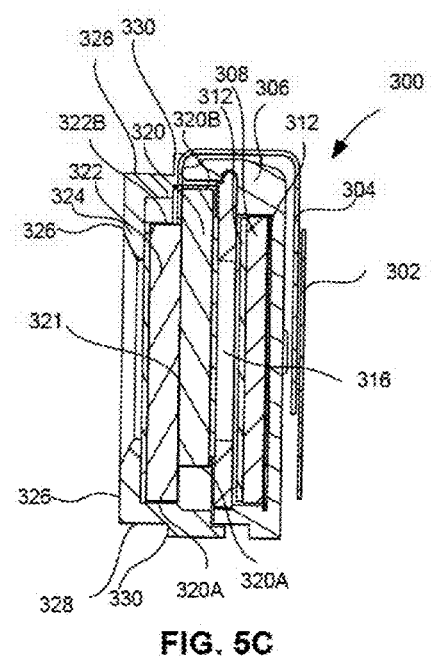
FIG. 5C is a cross-sectional view of the example display module of FIG. 5A.
Figure 5B:
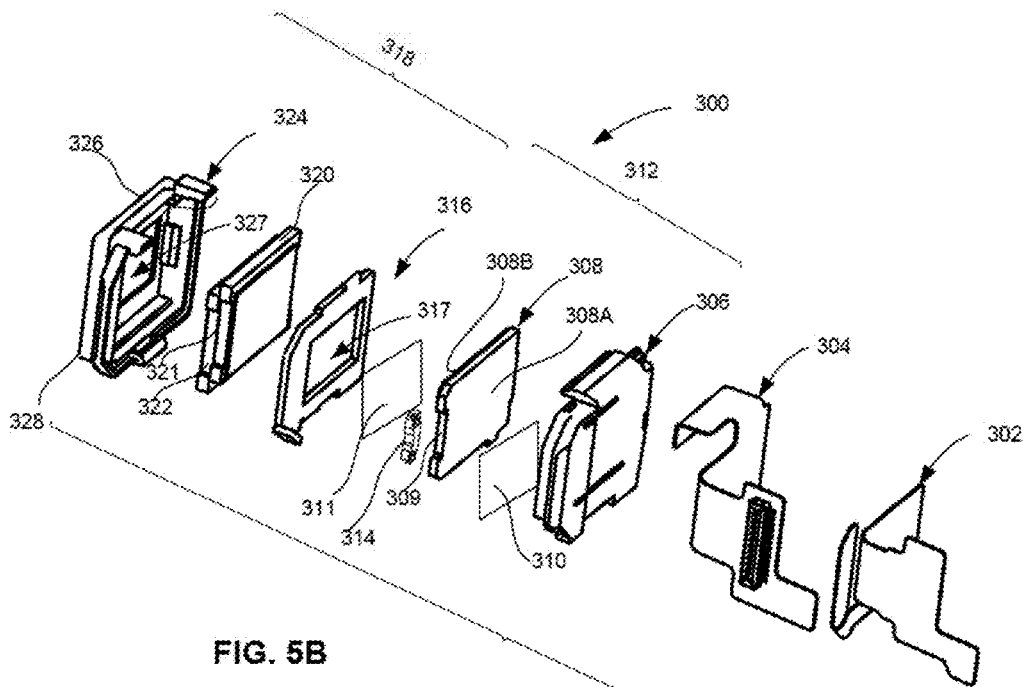
FIG. 5B is an exploded perspective view of the example display module of FIG. 5A.

In this example, with reference to FIG. 5B, an exploded view of display module 300 is shown. In this example, display module 300 is shown, including flexible circuit 302, LCD flexible circuit 304, backlight subassembly 312, and display subassembly 318. Each of these components will be described in more detail below.

The flexible circuit 302 is electrically connected with backlight subassembly 312 and other components in the head-mounted device assembly, such as the battery, imaging processors, etc. Similarly, LCD flexible circuit 304 electrically connects and provides communication between display subassembly 318 and the overall head-mounted device. Other electrical signals or powers may be delivered by the flexible circuit as needed. For example, shutters, electrically driven polarizers, or other light sources may communicate with LCD flexible circuit 304.

A backlight subassembly can be incorporated into display module 300 to provide the appropriate illumination for the data, information, or images to be displayed to the user. For example, backlight subassembly 312 includes a backlight housing 306, a backlight pipe 308, and a light source 314.

Backlight housing 306 houses the components of backlight subassembly 312. In this example, each of the components of backlight subassembly 312 is constructed and arranged to fit within backlight housing 306.

A light source 314 can be used to generate light that will travel throughout display module 300. Light source 314 may be any known light source, such as an LED, and can further be in a variety of colors, including a white LED. Other examples of light sources may include organic LEDs and inorganic LEDs. In this example, light source 314 is positioned directly adjacent backlight pipe 308 and further fits within recess 309 of backlight pipe 308. In other examples, light source 314 may be positioned elsewhere within opto-mechanical system 100 or elsewhere within the head-mounted device assembly.

Backlight pipe 308 of backlight subassembly 312 is positioned adjacent backlight housing 306 and helps light emanating from light source 314 to travel throughout the display module 300. Reflector film 310 is positioned adjacent surface 308A of backlight pipe 308 and a collimating film 311 is provided adjacent surface 308B. Reflector film 310 reflects light that escapes to the back of the backlight pipe 308 and redirects light back through backlight pipe 308. Light is then collimated through collimating film 311. Backlight spacer 316 is provided adjacent surface 308B of backlight pipe 308 and includes an opening 317. Light from backlight pipe 308 can travel through opening 317 of spacer 316.

A display subassembly may be provided within display module 300. In this example, display subassembly 318 can include an additional housing, such as LCD housing 324, as well as displays that provide information or images that can be projected via a projector (not shown) onto prism 120 for a user to see. In this example, two planar components of the LCD display plane 320,322 are housed within LCD housing 324. Display plane 320 may be a substrate, for example silicon, which may include a color filter, liquid crystal display, or a glass. Display plane 322 may be comprised of similar materials, including glass. An image plane 321 is positioned along the plane formed between the two LCD displays 320,322. Image plane 321 can be considered the source of the image, which represents the data. In other examples, one or more displays may be utilized. LCD housing 324 interconnects with backlight housing 306, such that when connected together with each of the interior components, a completed display module 300 is formed.

As shown, flexible circuit 304 extends over the backlight subassembly 312 and is interconnected and communicates with LCD housing 324. Flexible circuit 304 can provide the data or information necessary to project images onto displays 320,322. Flexible circuit 304 can be electrically connected to a circuit panel or other portions of an external device, such as a head-mounted device or added to the main electronics system of the head-mounted device. LCD housing 324 includes a front surface 326 extending around an opening 327, as well as an edge surface 328 extending away from front surface 326. An edge surface 330 extends generally perpendicular to surface 328 and extends around the perimeter of LCD housing 324. In other examples, different types of displays may be provided. For example, a Liquid Crystal on Silicon (LCOS) display can be implemented within the system, which may instead require use of front-lighting, instead of backlighting.

With reference to FIG. 5C, a side cross-sectional view of display module 300 is shown. LCD housing 324 is joined to backlight housing 306 and, in this example, LCD housing 324 interlocks with backlight housing 306. Display plane 320 is positioned within backlight housing 306, whereas display plane 322 is housed within LCD display housing 324. Displays 320,322 are staggered, such that respective bottom and top edges 320A,320B of display plane 320 are offset from respective bottom and top edges 322A,322B of display plane 322. Images can be provided at displays 320,322, which are then projected onto prism 120.

The position of LCD displays 320,322 within display module 300 can be pre-determined, based upon the expected final alignment of LCD displays 320,322 and prism 120. In this example, as will be explained in further detail below, when displays 320,322 are positioned within LCD housing 324 and the display module 300 is fully assembled, the completed display module 300 can then be joined to optics housing 200 and prism 120. Pre-positioning LCD displays 320,322 prior to complete assembly of display module 300 makes final alignment of LCD displays 320,322 dependent on the overall positioning of display module 300 relative to the rest of the opto-mechanical system. In other words, when display module 300 is fully assembled, display module 300 as a whole can be aligned relative to prism 120 and optics housing 200, as opposed to requiring readjustment or individual alignment of one or more displays 320,322 or other components within display module 300.

With reference to FIG. 6, each of the components of opto-mechanical system 100 is shown. When assembled together, an optical path 160 extends from display module 300 through prism 120 and onto the retina of a user. Optical path 160 is initially a substantially straight or linear path that can begin at image plane 321 of display module 300, where the image is generated, and travels through optics housing 200 and through prism 120. When optical path 160 reaches surface 126, which is mirrored and may be shaped, surface 126 redirects optical path 160 to point 158 along the prism redirection surface 125. Optical path 160 then exits surface 127 toward the eye. Optical path 160 is then redirected to the eye 159 of the user. In this example, as shown, the first or primary portion of optical path 160 extends in a substantially horizontal direction between displays 320,322 and surface 126 of prism 120. It should be understood that by controlling the shapes of these various interfaces, materials of the optical path, geometric sizes of these components, locations of these components, and the geometry of the user's head features, the desired trajectory, both horizontal and vertical, of the optical path to the eye may be properly designed and realized.

Figure 7:
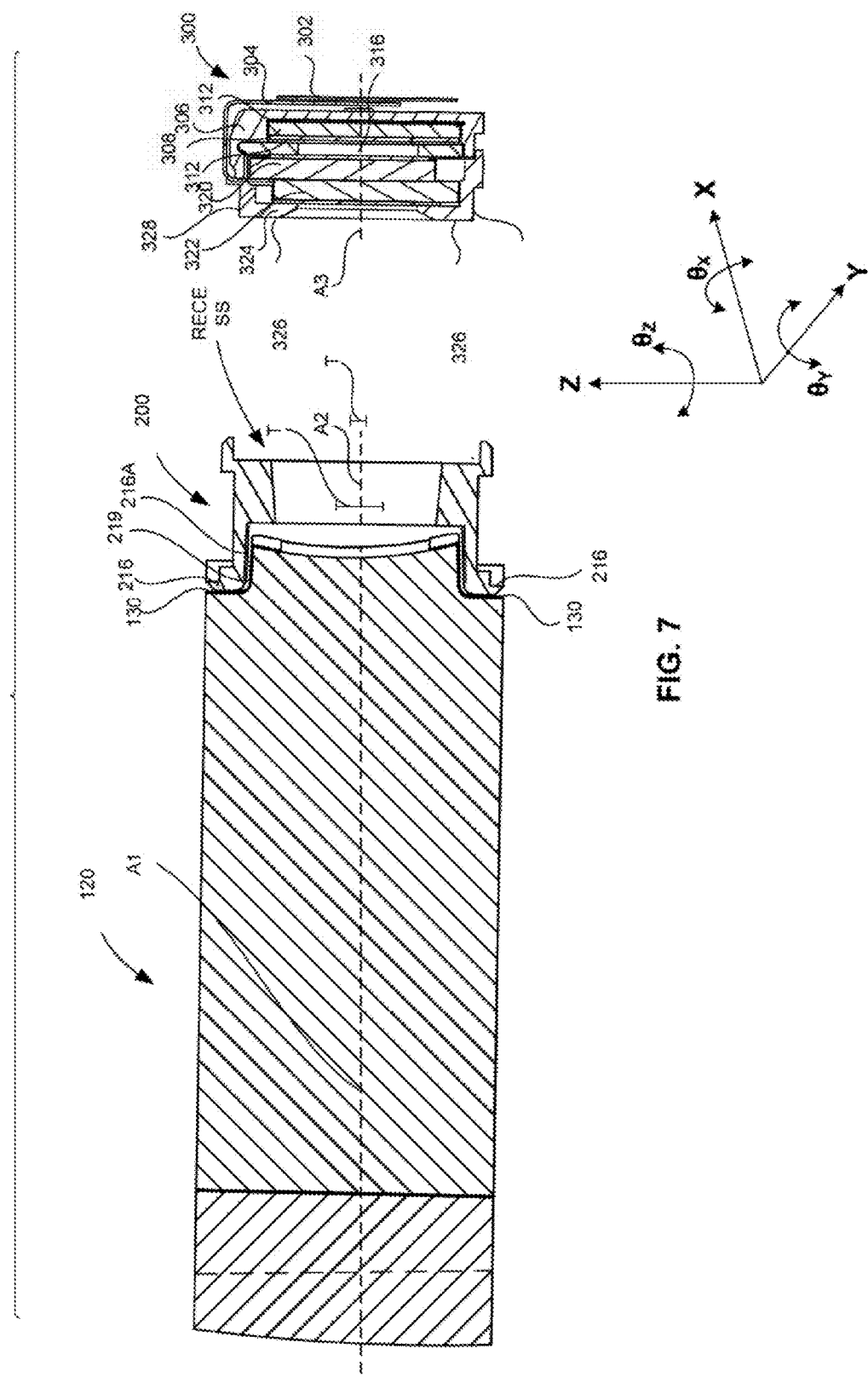
FIG. 7 is a partially assembled cross-sectional view of the example opto-mechanical system of FIG. 1.

During assembly, alignment of the components of opto-mechanical system 100 can result in optimal images being displayed to a user. Each component of opto-mechanical system 100 includes a primary optical axis which is typically at the center of the optical path through the component. In some cases that optical axis may lie on the central axis that extends through the component's mechanical center. For example, turning to FIG. 7, showing assembly of prism 120 with optics housing 200, prism 120 includes an axis A1, optics housing 200 includes an axis A2, and display module 300 includes an axis A3. Axis A3 also extends through the center of each of the components of display module 300. In one example, accurate alignment of the components of the opto-mechanical system results from alignment of the components of the opto-mechanical system along their respective central axes. An accurate alignment of prism 120, optics housing 200, and display module 300 can be achieved when the respective axes A1, A2, A3 of these components are aligned. In this example, alignment of these components along axes A1, A2, A3 will also fall along the optical path.

In other examples, one or more of axes A1,A2,A3 may not be positioned within the mechanical center of the respective prism 120, optics housing 200, and display module 300. In these example, axes A1,A2,A3 may instead extend along other portions of prism 120, optics housing 200, and display module 300.

Assembly of the opto-mechanical system is now described. In this example, prism 120 and optics housing 200 are joined together at an interface between the two components. For example, with reference still to FIG. 7, surface 130 of prism 120 may be joined to flange surface 216 of optics housing 200. Inner edge 129 of prism 120 is shown spaced away from divider surface 216A of optics housing 200, such that these surfaces do not contact one another. Similarly, edge surface 136 of prism 120 is spaced away from edge 206A of optics housing 200. As shown, prism 120 and optics housing 200 are aligned along their respective axes A1,A2. These two axes will be collinear when joined together, and these axes will also extend along the optical path.

Surface 136 of prism 120 can be joined to edge 216A of optics housing 200. Similarly, edge 129 of prism 120 and edge 216A of optics housing 200 can be joined. In one example, securing material 150, such as glue, an adhesive, other epoxy, or other joining material, can be deposited at the interface between edges 130,216. In another example, plastic laser welding may be used to join prism 120 and optics housing 200. In other examples, including some described herein, some of the surfaces of prism 120 may directly contact optics housing 200, such that it may be unnecessary or optional to use a joining material to secure optics housing 200 and prism 120 together.

Once prism 120 and optics housing 200 are joined together, display module 300 can then be aligned and secured to these components. In one example, axis A3 of display module is aligned with axes A2 and A1. To obtain an optimal image, display module 300 can be further moved relative to prism 120 to achieve an alignment that results in images/information projected onto prism 120 that have one or more characteristics including brightness, sharpness, focus, contrast, and other desired optics parameters. In one example, display module 300 may be actively aligned with prism 120 until optimal results are obtained. In other examples, display module 300 may also be actively aligned with optics housing 200, until optimal results are obtained.

During assembly, as display module 300 is joined to optics housing 200, display module 300 can be moved, up to at least six degrees of freedom, relative to prism 120 and optics housing 200. Specifically, when display module 300 is initially joined to optics housing 200 and positioned within second opening 228 of optics housing 200, display module 300 is free to translate within optics housing 200 in three perpendicular axes (x,y,z) and can move forward/backward, up/down, or left/right. These movements can also be combined with rotation about each of these three perpendicular axes. The ability for display module 300 to move in six degrees of freedom relative to optics housing 200 allows for the accurate alignment of axis A3 of display module 300 relative to axes A1,A2. In this example, active alignment of display module 300 also aligns each of display plane 320,322 relative to prism 120, so that optimal optics features, including one or more of brightness, sharpness, and focus, can be achieved.

Alignment of axis A3 of display module 300 with axes A2 and A3 can be critical to achieving optimum optical properties. In this example, alignment of axis A3 must fall within a certain tolerance T relative to optics housing 200 and prism 120. In one example, axis A3 is aligned with axes A1,A2 within a certain tolerance T. In this example, tolerance T is ±100 microns. In other examples, larger or finer tolerances may be realized based upon the optical design. For example, some designs may require tolerances of ±10 microns, whereas in other examples, a tolerance of ±500 microns may be desired. The alignment of axis A3 with axes A1,A2 within tolerance T along the z-axis can have a substantial impact on the focus of the image projected onto prism 120 and displayed to a user.

In other examples, it may be desired to join prism 120 and optics housing 200 together, without aligning axes A1 and A2. Prism 120 and optics housing 200 may be joined together, based upon the geometric fit between the optics housing 200 and prism 120. For example, prism 120 and optics housing 200 may be machined to fit together or interlock with one another, making alignment of axes A1,A2 unnecessary. It may then be desired to only align axis A3 of display module to either or both axes A1 or A2.

Once axes A1,A2,A3 are aligned, display module 300 can be further actively aligned or adjusted to achieve a more enhanced image. While alignment of axes A1,A2,A3 is expected to produce desired or optimal images, there are many variable factors that can affect the final image displayed to a user. For example, prism 120, optics housing 200, and display module 300 may be properly machined to fit together. Slight differences in the machining of prism 120, optics housing 200, and display module 300 may result in an alignment that does not produce the best or desired image. The displays within display module 300 must also be aligned at a particular position within display module 300. Even if the mechanical center of display module 300 is aligned with the mechanical centers of optics housing 200 and prism 120, an improper alignment of display planes 320,322 within display module 300 may produce a deficient image. These and other numerous variables can affect alignment of axes A1,A2,A3 and/or the production of an optimal image. To allow for such variables, further adjustment of display module 300 can be made.

Display module 300 can be further adjusted to improve one or more qualities of the image, such as brightness, sharpness, focus, contrast, and MTF. The adjustment may be one that is manually conducted by a user actively monitoring various image qualities until a predetermined image quality (ies) is obtained. The user may also adjust display module 300 by viewing the image that is projected onto the prism 120 and further adjusting display module 300 based on the visual perception of the image by the user until the user is satisfied with the image. Adjustment of display module 300 may also be automated such that a machine or device further adjusts display module 300 based on one or more predetermined image qualities.

In one example, display module 300 may be adjusted relative to optics housing 200 and prism 120 until one or more of the following image qualities is obtained: brightness ranging from 1300-1500 nits; a contrast ratio of 70:1 to 100:1; a minimum 3-pixel MTF equal to 30%; and a minimum 5 pixel MTF equal to 50%; and a maximum distortion of 3%. Adjusting display module 300 to provide an image quality outside of these example ranges or values is also contemplated within the scope of the disclosure. Further, combinations of these image qualities may be desired. For example, it may be desired to only adjust for brightness and contrast or MTF and distortion, or any combination of these or other image qualities not expressly identified herein.

In other examples, it may be desired to only adjust display module 300 relative to optics housing 200 and prism 120 to improve the qualities of an image, without the need to first align axis A3 with axes A1 and A2. For example, display module 300 may be joined with optics housing 200 without undertaking the additional step of aligning axis A3 with axes A1 or A2. In such example, display module 300 may be joined to optics housing 200 and then adjusted for one or more image qualities, such as brightness, sharpness, focus, contrast, distortion, and MTF.

Figure 8:
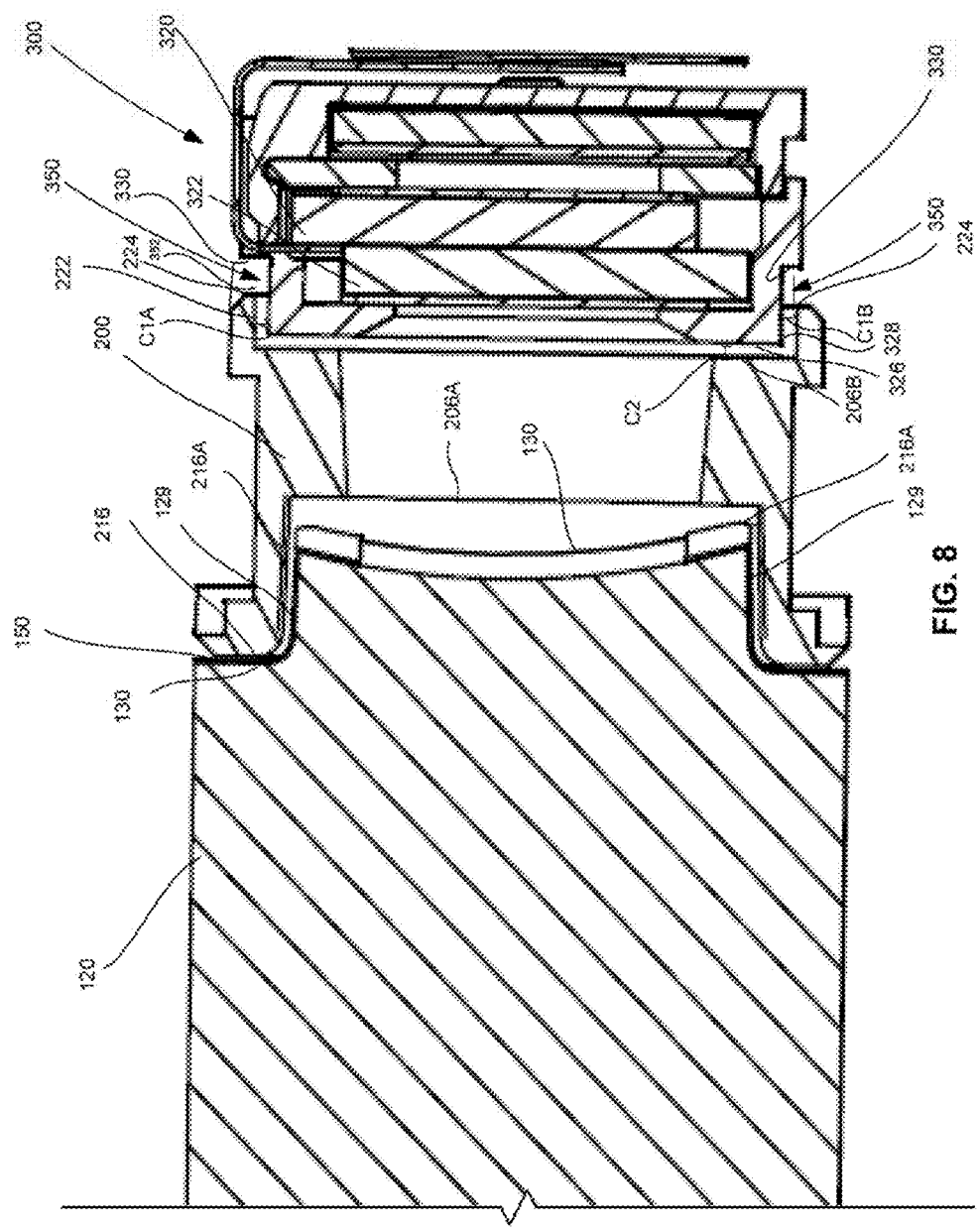
FIG. 8 is an enlarged cross-sectional view of the opto-mechanical system of FIG. 1.

With reference to FIG. 8, an enlarged view of a fully-assembled portion of opto-mechanical assembly 100 is shown. To allow for active alignment of display module 300 relative to one or both of the optics housing 200 and optics display, clearances can be provided between the components of opto-mechanical system 100. For example, clearances can be provided between display module 300 and optics housing 200. As shown, clearances C1A, C1B are positioned between interior edge 222 of optics housing 200 and edge surface 328 of LCD housing 324 of display module 300. Clearances C1A and C1B can range between 0 mm-0.5 mm. In other examples, the clearances may range between 0.1 mm-0.5 mm or may instead range between 0.5 mm-3 mm. In still other examples, clearances C1A and C1B can be greater than 0.1 mm or greater than 0.5 mm. Clearance C2 is positioned between surface 206B of optics housing 200 and edge surface 326 of LCD housing 324 of display module 300. Clearance C2 can range between 0 mm-0.5 mm. Similar to clearances C1A and C1B, in other examples, the clearances may range between 0.1 mm-0.5 mm or may instead range between 0.5 mm-3 mm. In still other examples, C1A and C1B can be greater than 0.1 mm or greater than 0.5 mm. These clearances provide the room necessary for display module 300 to be adjusted and moved relative to prism 120 in up to six degrees of freedom until the alignment between of the components provides optimum results, including, without limitation, one or more of brightness, sharpness, contrast and focus. An optimal image can be obtained by combining axial alignment of axes A1,A2,A3 and further manual adjustment of display module 300 relative to optics housing 200 and prism 120. In another example, an optimal image can be obtained by only manually adjusting of display module 300 relative to optics housing 200 and prism 120.

When the desired alignment of display module 300 relative to prism 120 is determined, display module 300 can be secured to optics housing 200. In one example, a securing material may be provided at the interface between display module 300 and optics housing 200. For example, a securing material can be provided along edge surface 328 of display module 300 and interior edge 222 of optics housing 200. Similarly, a securing material can be provided at the interface between divider surface 206B of optics housing 200 and edge 326 of display module 300. The securing material can be glue, an adhesive, epoxy, or other material capable of securing display module 300 and optics housing 200 together. In this example, display module 300 and prism 120 will therefore be fixed relative to one another.

Opto-mechanical system 100 can be sealed once the components (i.e., prism 120, optics housing 200, and display module 300) are assembled together. Sealing of the components is desired to protect the integrity of the opto-mechanical system. For example, sealing can allow for waterproofing of the opto-mechanical system and prevention of contamination from dust or particles.

A sealing material disposed between the optics housing and display module can be used to seal opto-mechanical system 100. For example, at least one groove 350 filled with a sealing material (not shown) can be formed between optics housing 200 and display module 300 due to mating of the components. As shown, groove 350 is formed between edge 330 of display module 300 and edge 224 of optics housing 200. Any sealing material 352, such as an adhesive, including ultra-violet curable adhesives, RTV silicone adhesives, and epoxies, such as two part epoxies, can be provided within groove 350. Alternatively, an O-ring or the like may be placed within groove 350.

Due to the construction and arrangement of the opto-mechanical system, as well as the use of a sealant material, it is possible to seal the opto-mechanical system. In one example, it is possible to achieve an opto-mechanical system with an Ingress Protection rating of IP67, which allows for total dust protection and immersion in water or fluids between 15 cm-1 m in depth. In other examples, the IP rating can vary. For example, the IP rating may reach up to IP69K or be less than IP67.

Figure 9:
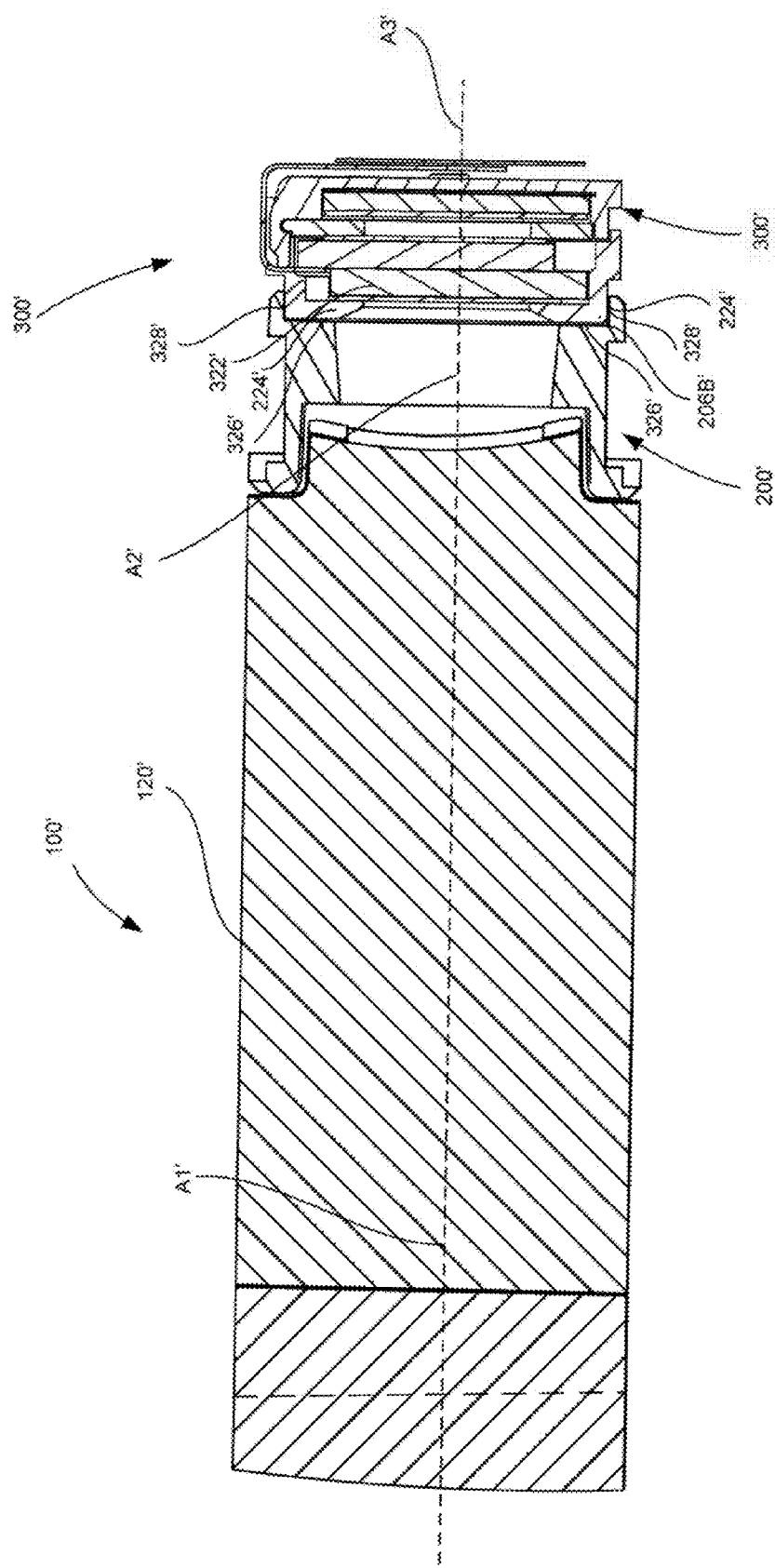
FIG. 9 is a cross-sectional view of another example opto-mechanical system in accordance with another aspect of the disclosure.

Turning now to FIG. 9, another example opto-mechanical system 100' is shown. This example is similar to the previous example, except that display module 300' is passively aligned with prism 120'. Similar reference numerals will therefore be used to describe similar features. During assembly of opto-mechanical system 100', passive alignment allows for an accurate alignment of the components of opto-mechanical system 100' without the need to manually adjust one or more of the components to obtain a desired alignment and/or optimum optical characteristics. By minimizing the need to adjust one or more components during assembly of system 100', the assembly of opto-mechanical system 100 can be automated.

In one example of passive alignment, each component of opto-mechanical system 100 is manufactured to fit together so that central axes A1',A2',A3' of each component are automatically aligned upon assembly. For example, the fit between optics housing 200' and display module 300', as well as the fit between prism 120' and optics housing 200', may be more exact so that the clearances provided between these components are negligible. For example, clearances on the order of ±50 microns may be implemented in the system. This can help to prevent any further movement of display module 300' within optics housing 200' when the two components are joined together, as well as prevent further movement of prism 120' within optics housing 200'. Providing an exact position for one or more of these components upon assembly ensures proper alignment of these components upon completion of the assembly. This, in turn, can provide optimum optical properties for the opto-mechanical system.

When optics housing 200' and display module 300' are joined together, no further adjustment or alignment is required. In this example, edge 328' of display module 300' is directly adjacent edge 224' of optics housing 200', and negligible clearances may be provided between these two edges 224',328'. Similarly, it may be further desired that front surface 326' of display module 300' and surface 206B' of optics housing 200' are directly joined together and that negligible clearances are provided between these two components. In one example of passive alignment, the components can be designed so that they snap-fit together. A securing material, such as a glue, adhesive, epoxy or any material used to join two materials together, can be used to further secure these components together.

Figure 10:
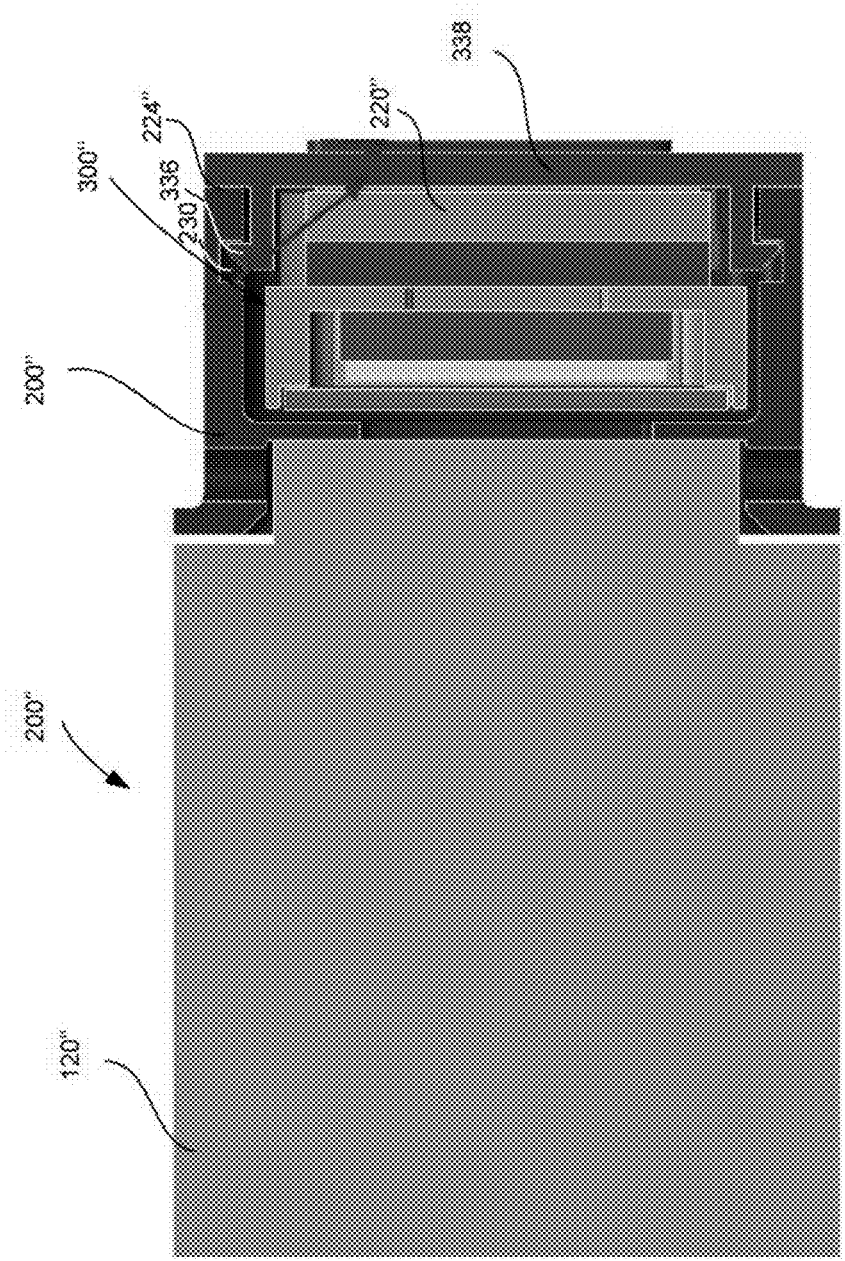
FIG. 10 is a cross-sectional view of another example opto-mechanical system in accordance with another aspect of the disclosure.

FIG. 10 illustrates another schematic example of an opto-mechanical system 500 that can be incorporated into a head-mounted display. In this example, opto-mechanical system 500 includes a prism 120", an optics housing 100", and a display module 300".

Optics housing 200" is a central structure that can be used to connect and align prism 120" and display module 300". Optics housing 200" includes a divider 206" that separates prism 120" from display module 300". Divider 206" includes a first surface 206A" that faces prism 120, as well as a second surface 206B' that faces display module 300'. Optics housing 200" is constructed and arranged so that the entire display module 300" is housed within optics housing 200". An interlocking recess 230 is also provided within optics housing 200" between divider surface 206A" and first outer surface 224".

Display module 300" is comprised of a different architecture than the previously discussed display module 300. In this example, a Liquid Crystal on Silicon (LCOS) architecture is utilized. As shown, prism 120" is provided at the back or rear of display module 300" and front-lighting is used throughout display module 300". As shown, display module 300" includes a display module backer 334 to which the other components of display module 300" are attached. Display module 300" further includes flanges 336 that interlock with recesses 230 in optics housing 200" to secure the display module 300" to the optics housing 200".

As shown, negligible clearances can be provided between the components connected to optics housing 200". Prism 120" is directly adjacent first surface 206A" of optics housing 200". As shown, no clearances or only negligible clearances are provided between edge surface 128" of prism 120" and surface 206A" of optics housing 200". Display module backer 338 directly abuts the first outer surface 224" of optics housing 200". Because the other components of display module 300" are attached to display module backer 338, the rest of display module 300" is positioned so that it will be precision aligned with optics housing 200" and prism 120". Display module 300" and prism 120" can snap into optics housing 200", such that no further adjustment of display module 300" is possible.

Figure 11:
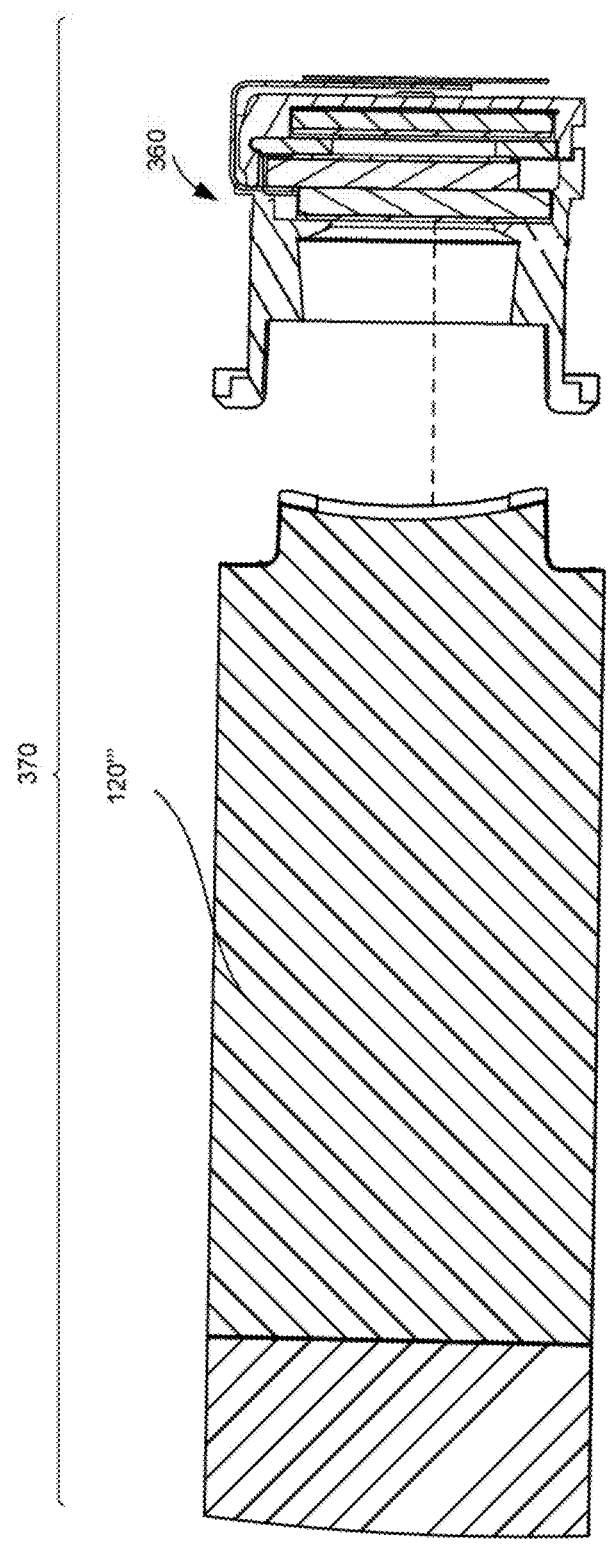
FIG. 11 is a cross-sectional view of another example opto-mechanical system that is partially assembled in accordance with another aspect of the disclosure.

In an alternative example, the optics housing and display module may be formed as one unit. In such example, such as shown in FIG. 11, instead of a separate optics housing, display module and optics housing can be manufactured as one unit to form a unitary display housing module 360. Display housing module 360 may then be joined together with prism 120''' to form an opto-mechanical system 370. In this example, opto-mechanical system will be comprised of two primary components, a display housing module 360 and prism 120'''. If active alignment is desired, a clearance can be provided between prism 120''' and display housing module 360 to permit movement of prism 120''' relative to display housing module 360. In another example, if passive alignment is desired, the fit between prism 120''' and display housing module 500 can be more exact such that minimal to no clearance is provided. Prism 120''' can instead snap into display housing module 400 and achieve a predetermined fit and alignment. In another example, optics display, such as prism 120''', can be integrally formed with optics housing, and then only the display module needs to be connected therewith.

Figure 12:
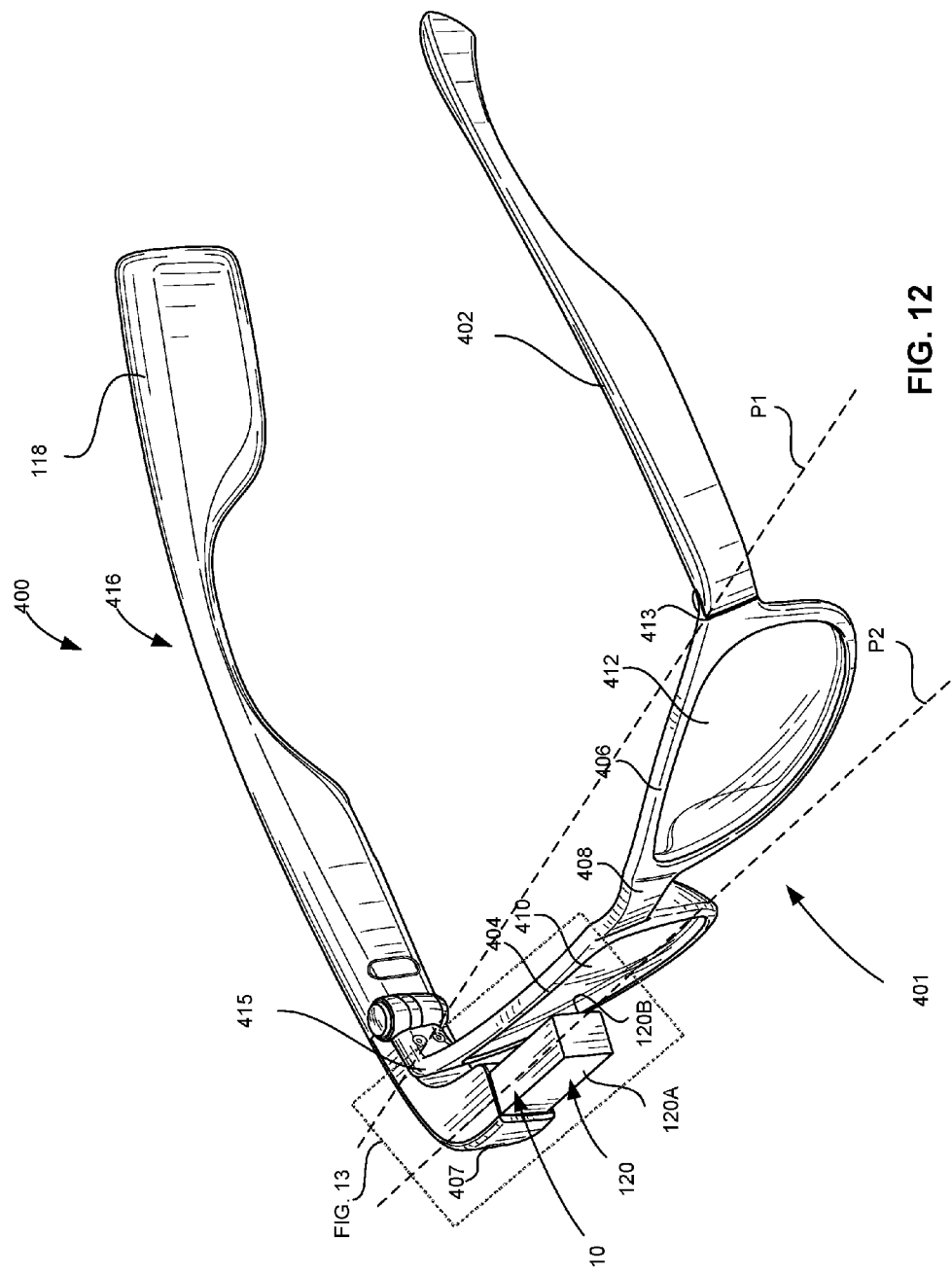
FIG. 12 is a perspective view of an example head-mounted device incorporating the example opto-mechanical system of FIG. 1 in accordance with aspects of the disclosure.

With reference to FIG. 12, an example of a head-mounted device 400 that can incorporate the opto-mechanical system 100 of FIG. 1 is shown. Head-mounted device 400 is capable of receiving, transmitting, and displaying data. Head mounted device 400 is an example of a glasses-style, head-mounted device possessing an overall appearance that is similar to a conventional pair of eyeglasses or sunglasses. However, other types of head-mounted devices could additionally or alternatively be used.

It is to be appreciated that reference made to an eyeglass frame or a pair of eyeglasses herein is not limited to any one type of eyeglasses or eyewear, but can include prescription and non-prescription sunglasses, prescription and non-prescription eyeglasses, or any type of eyewear that can be used for a head-mounted device or eyewear assembly that may or may not include lenses. For ease of discussion, reference will be made to an eyeglass frame or eyeglasses, but it is to be understood that such description is applicable to all types of eyewear. Additionally, references to lens elements or lenses can refer to prescription lenses, non-prescription lenses, tinted lenses, or any type of lenses that may be desired by a user.

Head-mounted device 400 is comprised of several components, including lens frames 404,406, a middle frame support 408, lens elements 410,412, and a first side arm or frame arm 402 extending away from lens frame 406. The combination of lens elements 410,412, as well as center frame support 408, forms a unified central frame support 401. Each of lens frames 404,406 and frame arm 402 may be formed of a solid structure of plastic and/or metal, or may be a hollow structure of similar materials. Other materials are also contemplated within the scope of the application.

Head-mounted device 400 further includes a second side arm or an optics arm 416 extending away from lens frame 406. In this example, optics arm 416 houses all of the electronic components of head-mounted device 400. For example, optics arm 416 may house the electrical circuitry, battery, processors, speakers, audio, and the like, that are used to operate the device. In other embodiments, some of these components may be positioned in other parts of the head-mounted device, including central frame support 401. Optics arm 416 may also include a light pass hole (not shown) and an imaging device 407, such as a camera, facing outward, which can capture both still and video images.

Frame arm 402 and optics arm 416 secure the head-mounted device 400 to the head of a user. In this example, frame arm 402 extends in a direction away from outer edge 413 of lens frame 406 and is designed to fit over the ear of a user to secure the head-mounted device 400 to one side of the user's head. As shown, central frame support 401 extends horizontally along plane P1 through points 413, 415. Prism 120', as well as the rest of opto-mechanical system (not shown) extends in front of central frame support 401 and along horizontal plane P2 that can intersect with plane P1. In other embodiments, prism 120 and opto-mechanical system 100 may be in a plane that is parallel to P1.

Optics arm 416 can be removably connected to opposed outer edge 415 of lens frame 404. Optics arm 416 is constructed and arranged to fit over one ear of a user to help secure the head-mounted device 400 to the other side of the user's head. Optics arm 416 and frame arm 402 may further secure the head-mounted device 400 to the user by either or both optics arm 416 and frame arm 402 extending around a rear portion of the user's head.

Figure 13:
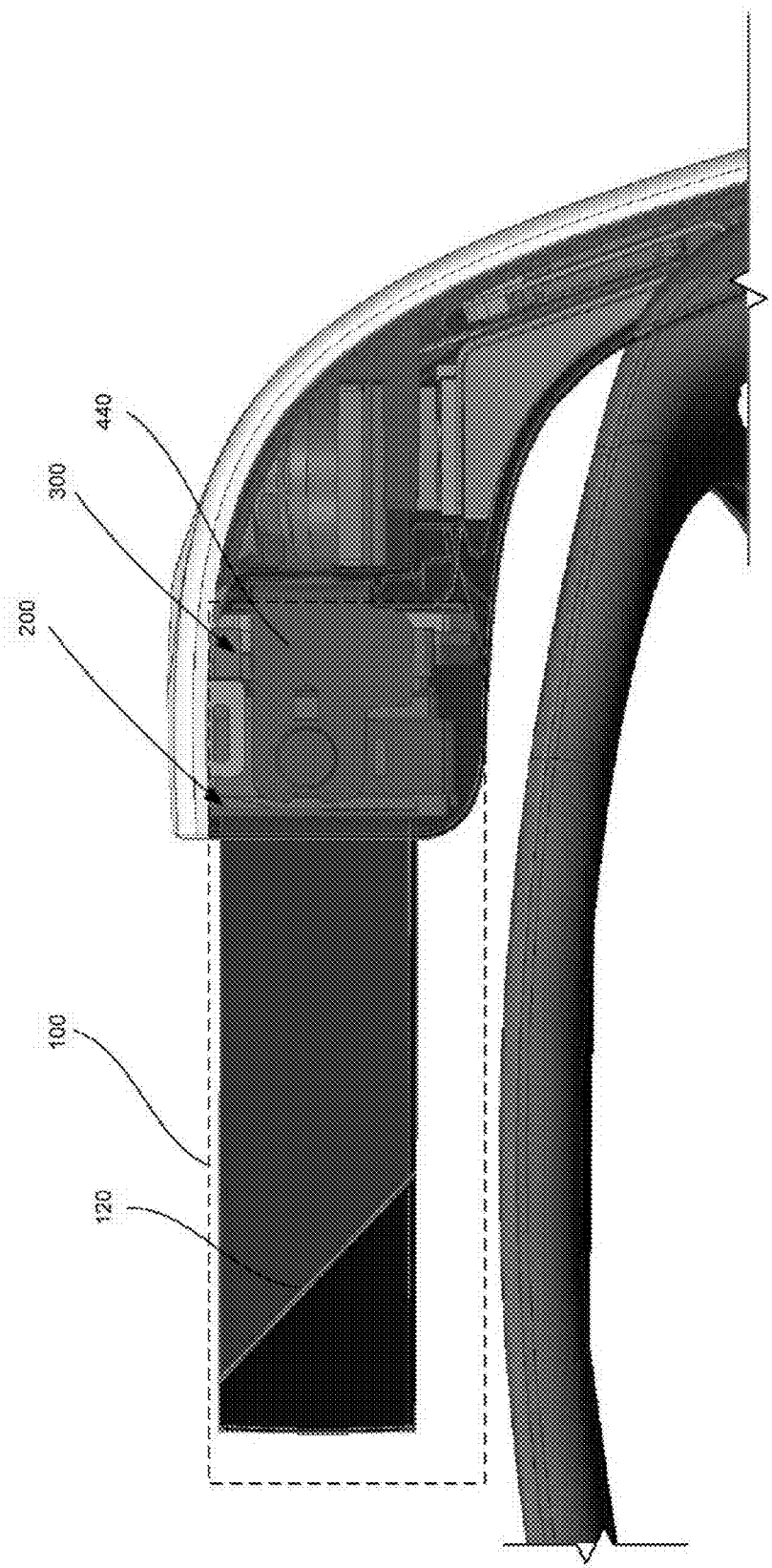
FIG. 13 is an enlarged view of a portion of FIG. 12.

Optics arm 416 can include opto-mechanical system 100. With reference to FIG. 13, a top view of an enlarged portion of FIG. 12 is shown. In particular, a see-through view of optics arm 416 illustrates an example opto-mechanical system 100 mechanically and electrically connected to other components of the head-mounted device 400, according to aspects of this disclosure. Opto-mechanical system 100 is shown positioned at the front end of optics arm 416, such that prism 120 can be positioned directly in the line of sight of a user. In this example, optics housing 200 and display module 300 are positioned within outer housing 200 of optics arm 416 but, in other examples, system 100 could be positioned partially or fully external to optics arm 416. Opto-mechanical system 100 is mechanically and electrically connected to other components of head-mounted device 400. A bracket 440 can be mounted to optics housing 220 to secure opto-mechanical system 100 to the head-mounted device. Through the flexible circuit (not shown) of opto-mechanical system 100, system 100 can be electrically connected with other components of head-mounted device 400, including an onboard computing system, as discussed below.

Head-mounted device 400 may include an onboard computing system. In one example, the onboard computing system (not shown) is housed within optics arm 416. Such a computing system may include a processor and memory, for example. The onboard computing system may be configured to receive and analyze data from imaging device 107 and/or any other device within or mounted to the head-mounted device 400 or in communication with the head-mounted device 400.

Figure 14:
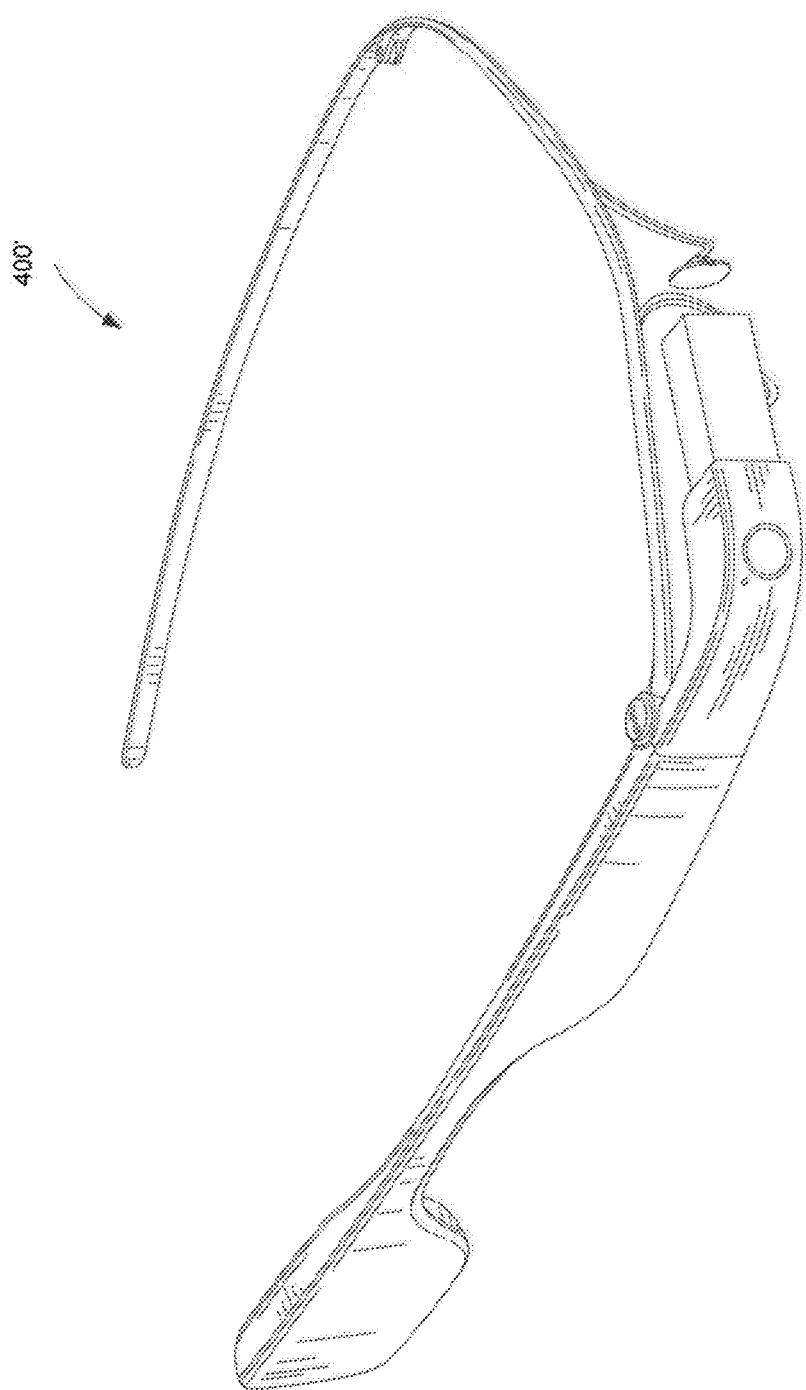
FIG. 14 is a perspective view of another example head-mounted device incorporating an opto-mechanical system in accordance with another aspect of the disclosure.

With reference now to FIG. 14, another example of head-mounted device 400' that can utilize the opto-mechanical system (not shown) according to aspects of this disclosure is shown. This head-mounted device is a band-style, head-mounted device. As shown, head-mounted device 400' includes a band 460 connected to optics arm 416'. Optics arm 416' is identical to optics arm 416, discussed with regard to FIG. 12, and can house an opto-mechanical system as disclosed herein. Frame arm 402' is shown connected to the front end 413' of front or central frame support 401', and optics arm 416' is shown connected to the of central frame support 401. Frame arm 402' and optics arm 416' form on overall U-shaped assembly that can be worn on a user's head.

The example embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "in this example," "for example," "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of assembling an opto-mechanical system for a head-mounted device, the method comprising:
    joining an optics display to a first open end of an optics housing, wherein the optics display is configured to be positioned in front of an eye of a user and to display images to the user that are projected onto the optics display through the optics housing;
    positioning at least a portion of the display module within a second open end of the optics housing, the display module configured to project the images onto the optics display;
    moving the display module while the at least a portion of the display module is positioned within the optics housing relative to the optics display so that a first axis extending through the display module is aligned with a second axis extending through the optics display, wherein the display module moved in six degrees of freedom; and
    securing the display module to the optics housing so that the display module and optics display are accurately optically aligned and fixed relative to one another.

2. The method of claim 1, further comprising securing the optics display to the optics housing before the step of aligning the display module.

3. The method of claim 1, wherein the step of aligning the display module comprises moving the display module so that a first central axis extending through a mechanical center of the display module is aligned with a second central axis extending through the mechanical center of the optics display.

4. The method of claim 3, wherein the step of aligning the display module further comprises axially aligning the first central axis of display module within a predetermined tolerance relative to the second central axis.

5. The method of claim 4, wherein the step of aligning the first and second central axes comprises aligning the first and second central axes along a horizontal plane.

6. The method of claim 1, wherein prior to the step of securing the display module to the optics housing, the display module is adjusted relative to the optics display and within the optics housing so as to obtain an image having at least one predetermined image quality selected from the group comprising brightness, sharpness, contrast, focus, modulation transfer function (MTF), and distortion.

7. The method of claim 6, wherein the step of aligning the display module occurs before the step of adjusting the display module.

8. The method of claim 5, wherein brightness ranges from 1300-1500 nits; a contrast ratio ranges from 70:1 to 100:1; a minimum 3-pixel MTF equals 30%; a minimum 5 pixel MTF equals 50%; and a maximum distortion of 3%.

9. The method of claim 6, wherein the display module is adjusted so that the image has more than one predetermined quality.

10. The method of claim 1 further comprising, forming a groove between the display module and the optics housing, and disposing a sealant material within the groove.

11. The method of claim 1, further comprising sealing the opto-mechanical system so that the opto-mechanical system has an Ingress Protection rating of at least IP67.

12. An opto-mechanical system for a head-mounted device, the system comprising:
an optics housing having a first open end, a second open end, and an interior surface positioned within the second open end;
an optics display positioned adjacent the first open end of the optics housing and extending away from the first open end of the optics housing, the optics display including a first surface adapted to display images projected onto the optics display to a user, the optics display configured to be positioned in front of an eye of a user; and
a display module positioned adjacent the second open end of the optics housing, the display module having a first exterior surface positioned partially within the optics housing, the display module constructed and arranged to project the images onto the optics display,
wherein the optics housing joins the optics display and the display module together, and wherein the first exterior surface of the display module is spaced a first predetermined distance away from the first interior surface of the optics housing, the first predetermined distance being sufficient to allow for movement of the display module within the optics housing in six degrees freedom to accurately optically align the optics display and the display module.

13. The opto-mechanical system of claim 12, wherein the optics housing comprises a second surface facing the optics display, the optics display being at least partially positioned within the optics housing and spaced a second predetermined distance away from the second surface of the optics housing.

14. The opto-mechanical system of claim 12 further comprising a gap positioned between an exterior surface of the display module and an exterior surface of the optics housing; and a sealant disposed within the gap, wherein the opto-mechanical system has an Ingress Protection rating of at least IP67.

15. The opto-mechanical system of claim 12, wherein the optics housing, optics display, and display module are fixed relative to one another.

16. The opto-mechanical system of claim 12, wherein each of the optics housing, the optics display, and the display module further includes an axis extending through respective mechanical centers thereof, the respective axes of the optics housing, optics display, and display module being axially aligned along a horizontal plane.

17. A head-mounted device assembly comprising:
a central frame support having a first side arm and a second sidearm extending away from first and second ends of the frame support; and
an opto-mechanical system for displaying images to a user, the opto-mechanical system extending in a horizontal direction and including an elongated optics display extending in front of the central frame support, the opto-mechanical system further comprising:
an optics housing having a first open end and a second open end;
an optics display positioned adjacent and extending away from the first open end of the optics housing, the optics display displaying images projected onto a surface of the optics display; and
a display module positioned adjacent the second open end of the optics housing, the display module constructed and arranged to project the images onto the optics display, the display module further comprising a display module housing,
wherein the optics housing joins the optics display and display module together, and wherein the optics housing has a first interior surface facing the display module, a front surface of the display module housing being positioned within the optics housing and spaced a first predetermined distance away from the first interior surface of the optics housing; and
wherein the first predetermined distance is sufficient to allow for movement of the display module within the optics housing in six degrees freedom to accurately optically align the optics display and the display module.

18. The head-mounted device of claim 17, wherein the opto-mechanical system is at least partially housed within one of the side arms.

19. The head-mounted device of claim 18, wherein the opto-mechanical system is completely housed within the one of the side arms and the one of the side arms is removably connected to the central frame support.

20. The method of claim 1, wherein the moving the display module occurs before the securing the display module, and wherein the moving the display module in the six degrees of freedom changes at least one image quality of the projected image generated by the display module, the at least one image quality selected from the group comprising brightness, sharpness, contrast, focus, modulation transfer function (MTF), and distortion.

* * * * *